Patented Oct. 9, 1934

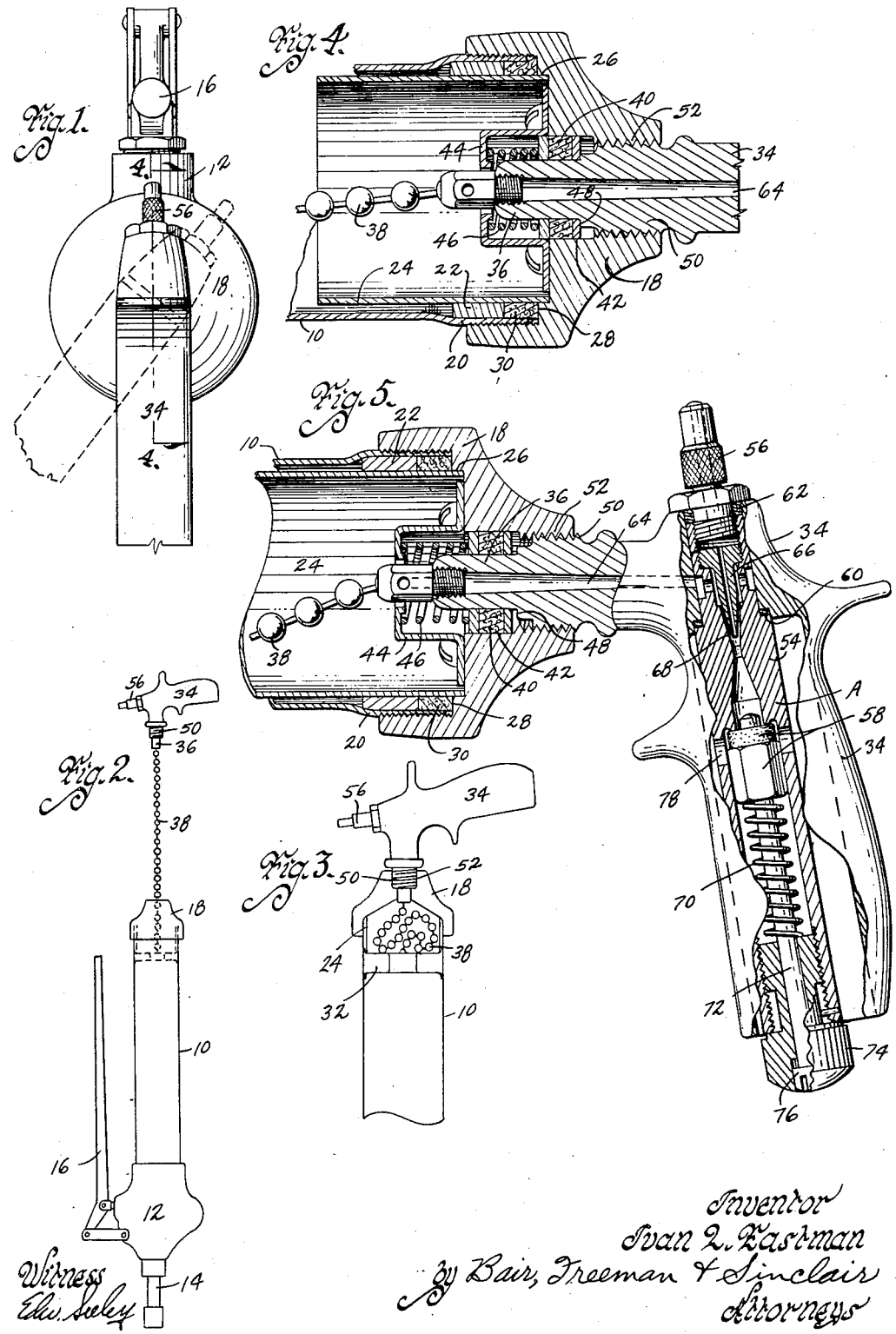

1,976,061

UNITED STATES PATENT OFFICE 1,976,061

GREASE GUN STRUCTURE

Ivan L. Eastman, Bryan, Ohio, assignor to The Aro Equipment Corporation, Bryan, Ohio, a corporation of Ohio Application January 23, 1933, Serial No. 653,115

20 Claims. (Cl. 221—47.3)

An object of my present invention is to provide a grease gun structure having simple, durable and inexpensive mechanism for refilling the reservoir thereof and placing the contents thereof under pressure to force the grease from the reservoir into a discharge head or the like.

A further object is to provide a grease gun construction in which a follower piston is urged toward a discharge head of the grease gun by compressed air and means is provided for retracting the follower piston, which means can be either manually operated or operated by compressed air.

A further object is to provide a grease gun construction in which compressed air is used to extend the follower piston and manual means is used for retracting the piston consisting of a handle having a portion extended through a cover head of the grease reservoir and such portion having a flexible and collapsible connection with the follower piston so that the handle can be pulled for tightening the flexible connection and pulling the follower piston toward the cover head and thereafter the flexible connection can be collapsed within the grease reservoir so that the handle can be reconnected with the cover head.

Still a further object is to provide a novel sealing means for the handle when in its connected position so that the compressed air behind the follower piston will not leak to atmosphere.

Another object is to provide the handle screw-threadedly connected with the cover head and to adapt the sealing means for permitting slight rotative adjustment of the handle for alinement purposes without destroying the effectiveness of the sealing means.

Still a further object is to provide a novel gasket connection between a grease gun reservoir and a head therefor, making it possible to use sheet metal for the reservoir.

Still another object is to provide a combined intake, venturi and relief valve unit in the handle of the grease gun.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a rear end elevation of a grease gun construction embodying my invention.

Figure 2 is a diagrammatic side elevation of the same showing the follower piston being manually retracted.

Figure 3 is an enlarged diagrammatic view showing the step, after the retracting operation, of reconnecting the retracting handle with the grease gun.

Figure 4 is an enlarged sectional view on the line 4—4 of Figure 1 showing the cover head end only of the grease gun and omitting the handle; and Figure 5 is a similar sectional view showing the handle and showing packing means for the handle in a different position from the position of Figure 4.

On the accompanying drawing, I have used the reference numeral 10 to indicate a grease gun reservoir. A discharge head 12 is mounted thereon in the ordinary manner and has a discharge nozzle 14 and a booster pump 16, although my invention is applicable to other types of grease gun discharge heads.

Opposite the discharge head 12 is a cover head 18. It is screw-threaded on an enlarged screw-threaded portion 20 of the grease reservoir 10. The enlarged part 20 is provided for a ring 22 which serves as a gasket shoulder. The ring is prevented from longitudinal movement by the transition in the grease reservoir 10 from its normal diameter to the enlarged diameter of the portion 20.

Within the ring 22, I provide a sleeve 24. The cover head 18 has a recess 26 engaging the sleeve 24 and a shoulder 28 forming a gasket shoulder. A gasket 30 is adapted to be compressed between the enlarged portion 20 of the grease reservoir 10, the gasket shoulder formed by the ring 22, the sleeve 24 and the gasket shoulder 28 when the cover head 18 is screwed into position as shown in Figures 4 or 5. This makes an effectively sealed joint, although the reservoir 10 is made merely of sheet metal. The ring 22 provides a substantial gasket surface which could not be provided by using the end of the reservoir 10 as a gasket shoulder.

Within the grease reservoir 10 I provide a follower piston 32. It is adapted to engage grease in the reservoir and urge it toward the discharge head 12. Compressed air is introduced into the space in the reservoir 10 between the piston 32 and the cover head 18 for this purpose. The manner of introduction will be later described.

For retracting the follower piston 32 when it is desired to fill the reservoir 10 with grease, I provide a handle 34 having an extension 36 inserted through the cover head 18 and having a flexible connection 38 with the follower piston.

The flexible connection may be a link chain or a ball and socket chain of the type illustrated, or any flexible element which is capable of being collapsed. The purpose of such characteristics for the element 38 is so that it can provide an effective pulling means as shown in Figure 2 for retracting the piston 32 and can then be collapsed into the space in the sleeve 24, as shown in Figure 3, after the filling operation is completed. The sleeve 24 serves as a stop to prevent more than a predetermined retracting movement of the piston 32.

Since compressed air is utilized to force the piston 32 in its discharging direction, it is necessary to seal the joint between the extension 36 of the handle 34 and the cover head 18. For this purpose, I provide packing 40 within a bore 42. A retainer element 44 serves as an extension of the bore and contains a spring 46 normally imposing tension on the packing 40 as shown in Figure 4.

The extension 36 has a shoulder 48 which engages the packing, as shown in Figure 4, for increasing the tension of the spring 46, or for placing it under tension if it so happens that when the extension 36 is inserted in the head 18 the packing 40 is at its right hand limit of movement.

The handle 34 has a screw-threaded portion 50 engaging in screw-threads 52 of the cover head 18 to retain the handle relative to the head and prevent its being forced out of the head by the compressed air within the reservoir 10. These threads serve the purpose of positively projecting the shoulder 48 inwardly for increasing the tension of the spring 46 when the extension 36 is in its normal position of Figure 4.

This tightens the packing 40 on the extension 36, but when the handle 34 is rotated to position for removing it, the tension of the spring is partially or entirely relieved so that the packing 40 is no longer tightly compressed and the extension 36 can thereafter be readily removed or reinserted.

The spring 46 also permits considerable longitudinal movement of the packing relative to the bore 42 without changing the effectiveness of the seal produced by the packing. This is desirable as after the handle 34 is completely screwed into position, it may assume a position which is not alined with the booster pump 16 of the grease gun. For instance, it might assume the dotted line position of Figure 1. It can then be rotated to the alined solid line position and still remain sealed relative to the grease gun.

Within the handle 34 I provide a valve unit A comprising a valve body 54 having an intake valve 56 at one end, a relief valve 58 at its other end and Venturi valve parts intermediate the valves 56 and 58. The valve body 54 has a shoulder 60 between which and the body of the handle 34, a gasket is interposed. The intake valve 56 is of the ordinary tire valve type including an intake check valve and is adapted to be tightened against a gasket 62 as well as the upper end of the handle 34 for tightening the valve body 54 against the gasket at the shoulder 60.

A passageway 64 communicates between the valve body 54 and the interior of the grease reservoir 10. Compressed air introduced through the fitting 56 passes through a Venturi fitting 66 and then backs up through a Venturi bore 68 and enters the passageway 64. Thus compressed air may be introduced into the grease reservoir 10 behind the follower piston 32 therein.

It is desirable to limit the pressure of the compressed air. This is done by the relief valve 58 which is held seated by a spring 70. The spring 70 surrounds a valve stem 72 which is connected with the relief valve 58. A thumb screw 74 is adapted to change the tension of the spring 70 to some extent for predetermining the pressure at which the relief valve 58 will open. The thumb screw 74 is also adapted to positively open the valve 58 when it is desired to perform the Venturi operation. For this purpose, a head 76 on the stem 72 is engaged by the thumb screw 74 when it is rotated outwardly.

The Venturi operation mentioned consists in positively opening the relief valve 58 by screwing the thumb screw 74 outwardly, thus releasing the compressed air from the reservoir 10 through the passageway 64, Venturi bore 68, past the relief valve 58 and through ports 78 to atmosphere within the handle 34. After the air is released, compressed air may be introduced to the fitting 56 which will discharge from the Venturi fitting 66 and through the Venturi bore 68. This produces a vacuum within the reservoir 10 for thus retracting the follower piston 32 by compressed air rather than manually. After complete retraction, then the thumb screw 74 is again adjusted for closing the valve 58 and compressed air is introduced to the reservoir through the intake valve fitting 56. Thus my construction provides for either manual or compressed air retracting operation of the follower piston.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a grease gun construction, a grease reservoir, a discharge head on one end thereof, a cover head on the other end thereof having a shouldered bore, a follower piston within said grease reservoir, compressed air normally filling the space between said follower piston and said cover head, retracting means for retracting said follower piston to fill said grease reservoir, said retracting means extending through said cover head and packing in said shouldered bore surrounding said means to prevent leakage of compressed air from said grease reservoir, said packing including a spring, said means being retractable through said packing and spring and an abutment on said retracting means engaging said packing for thereby tightening it against said means and said bore and against the tension of said spring when said means is at its innermost position.

2. In a grease gun construction, a grease reservoir, a discharge head on one end thereof, a cover head on the other end thereof, a follower piston within said grease reservoir, compressed air normally filling the space between said follower piston and said cover head, retracting means for retracting said follower piston to fill said grease reservoir, said retracting means extending through said cover head and retractable therethrough during the retracting operation, said retracting means having an enlarged part adjacent its outer end packing in said cover head surrounding said enlarged part when said retracting means is at its inner position to prevent leakage of compressed air from said grease reservoir the remaining part of said retracting means being smaller in diameter than the interior diameter of said packing to facilitate retraction.

3. In a grease gun construction, a grease reservoir, a discharge head on one end thereof, a cover head on the other end thereof, a follower piston within said grease reservoir, compressed air normally filling the space between said follower piston and said cover head, retracting means for retracting said follower piston to fill said grease reservoir, said retracting means extending through said cover head and retractible therethrough during the retracting operation and packing in said cover head surrounding said retracting means to prevent leakage of compressed air from said grease reservoir, said packing being spring compressed and being engaged by said retracting means to increase the tension of the spring on the packing when the retracting means is at its inner position with respect to the cover head.

4. In a grease gun construction, a grease reservoir, a discharge head on one end thereof, a cover head on the other end thereof, a follower piston within said grease reservoir, compressed air normally filling the space between said follower piston and said cover head, retracting means for retracting said follower piston to fill said grease reservoir, said retracting means extending through said cover head and retractible therethrough during the retracting operation, packing in said cover head surrounding said retracting means to prevent leakage of compressed air from said grease reservoir, an elongated bore for said packing and a shoulder on said retracting means to decrease the effective length of said bore and thus tighten said packing when said retracting means is at its inner position with respect to said cover head.

5. In a grease gun construction, a grease reservoir, a discharge head on one end thereof, a cover head on the other end thereof, a follower piston within said grease reservoir, compressed air normally filling the space between said follower piston and said cover head, retracting means for retracting said follower piston to fill said grease reservoir, said retracting means extending through said cover head and retractible therethrough during the retracting operation and packing in said cover head surrounding said retracting means to prevent leakage of compressed air from said grease reservoir, said packing being spring compressed and being engaged by said retracting means to increase the tension of the spring on the packing when the retracting means is at its inner position with respect to the cover head, said retracting means having screw-threaded engagement with said cover head when the retracting means is in such position.

6. In a grease gun construction, a grease reservoir, a discharge head on one end thereof, a cover head on the other end thereof, a follower piston within said grease reservoir, compressed air normally filling the space between said follower piston and said cover head, retracting means for retracting said follower piston to fill said grease reservoir, said retracting means extending through said cover head and retractible therethrough during the retracting operation, packing in said cover head surrounding said retracting means to prevent leakage of compressed air from said grease reservoir, an elongated bore for said packing, a shoulder on said retracting means to decrease the effective length of said bore and thus tighten said packing when said retracting means is inserted through said cover head and a screw-threaded connection between said cover head and said retracting means when the latter is in inserted position.

7. In a grease gun construction, a grease reservoir, a discharge head on one end thereof, a cover head on the other end thereof, a follower piston within said grease reservoir, compressed air normally filling the space between said follower piston and said cover head, retracting means for retracting said follower piston to fill said grease reservoir, said retracting means extending through said cover head and retractible therethrough during the retracting operation, packing in said cover head surrounding said retracting means to prevent leakage of compressed air from said grease reservoir, an elongated bore for said packing, a shoulder on said retracting means to decrease the effective length of said bore and thus tighten said packing when said retracting means is inserted through said cover head and a screw-threaded connection between said cover head and said retracting means when the latter is in inserted position, said packing, being spring compressed, permitting slight rotative adjustment of said retracting means at the screw-threaded connection for alinement purposes without permitting leakage through said packing.

8. In a grease gun construction, a grease reservoir, a discharge head on one end thereof, a cover head on the opposite end thereof, a follower piston within said reservoir, means for retracting said follower piston comprising a handle exterior of said cover head and having a projection extending therethrough, a flexible connection between said projection and said follower piston, compressed air normally in the space between said follower piston and said cover head and means in said cover head surrounding said projection to prevent leakage of said compressed air from said space, said means comprising a packing gland having spring pressed packing material therein, said gland being elongated to permit longitudinal movement of said packing material relative thereto and said projection having a screw-threaded connection with said cover head and a shoulder engageable with said packing material.

9. In a grease gun construction, a grease reservoir, a discharge head on one end thereof, a cover head on the other end thereof, a follower piston within said grease reservoir and slidable longitudinally thereof, means for retracting said follower piston comprising a handle adapted to be inserted in said cover head and having a flexible and collapsible connection with said follower piston, packing in said cover head and means on said handle to engage and compress said packing.

10. In a grease gun construction, a grease reservoir, a discharge head on one end thereof, a cover head on the other end thereof, a follower piston within said grease reservoir and slidable longitudinally thereof, means for retracting said follower piston comprising a handle adapted to be inserted in said cover head and having a flexible and collapsible connection with said follower piston, said grease reservoir being normally filled with compressed air to urge said follower piston toward said discharge head and means for sealing said handle relative to said cover head to prevent leakage of said compressed air from said grease reservoir, said last means comprising packing surrounding the portion of said handle inserted in said cover head, said portion having shoulder means to engage said packing and compress it more tightly when said portion is so inserted.

11. In a grease gun construction, a grease reservoir, a discharge head on one end thereof, a cover head on the other end thereof, a follower piston within said grease reservoir and slidable longitudinally thereof, means for retracting said follower piston comprising a handle adapted to be inserted in said cover head and having a flexible and collapsible connection with said follower piston, said grease reservoir being normally filled with compressed air to urge said follower piston toward said discharge head, means for sealing said handle relative to said cover head to prevent leakage of said compressed air from said grease reservoir, said last means comprising packing surrounding the portion of said handle inserted in said cover head, said portion having means to engage said packing and compress it more tightly when said portion is so inserted and a screw-threaded connection between said portion and said cover head to cause and retain such engagement.

12. In a grease gun construction, a grease reservoir of sheet metal having one end thereof enlarged, a ring within said enlarged end and providing a gasket shoulder within said grease reservoir and spaced inwardly from the terminal end thereof, a gasket thereagainst, a sleeve within said gasket and a head on said enlarged end of said grease reservoir engaging said gasket and compressing it between said shoulder, said enlarged end, said sleeve and said head to seal said head relative to said grease reservoir.

13. In a grease gun construction, a grease reservoir, a head on one end thereof and means for sealing said head relative to said grease reservoir comprising a sleeve telescopically associated with said grease reservoir, a gasket positioned between said grease reservoir and said sleeve and means engaged by said gasket to limit its movement away from said head, said head being telescopically associated with said grease reservoir and said sleeve for drawing said head toward said gasket and compressing it between said last means, said grease reservoir, said sleeve and said head.

14. In a grease gun construction, a grease reservoir element, a head on one end thereof and means for sealing said head relative to said grease reservoir element comprising a sleeve element telescopically associated with said grease reservoir element, a gasket positioned between said grease reservoir element and said sleeve element and means between said elements engaged by said gasket to limit the movement of the gasket away from said head, one of said elements having a projection for said means to limit its movement longitudinally of said elements, said head being threadedly associated with said grease reservoir element and said sleeve element for drawing said head toward said gasket and compressing it between said sleeve element, said last means and said head.

15. In a grease gun construction, a grease reservoir element, a head on one end thereof and means for sealing said head relative to said grease reservoir element comprising a sleeve element telescopically associated with said grease reservoir element, a gasket positioned between said grease reservoir element and said sleeve element and annular shoulder means between said elements and engaged by said gasket to limit the movement of the gasket away from said head, one of said elements having a projection for said annular shoulder means to limit its movement longitudinally of said elements and away from said head, said head being threadedly associated with said grease reservoir element and said sleeve element for drawing said head toward said gasket and compressing it between said grease reservoir element, said sleeve element, said annular shoulder means and said head.

16. In a grease gun construction, a grease reservoir, a follower piston therein, a discharge head on one end of said grease reservoir and a cover head on the other end thereof, a handle on said cover head and an intake, relief and Venturi valve unit within said handle comprising a valve body communicating with the interior of said grease reservoir, an intake valve in one end of said valve body and a relief valve in the other end of said valve body.

17. In a grease gun construction, a grease reservoir, a follower piston therein, a discharge head on one end of said grease reservoir and a cover head on the other end thereof, a handle on said cover head and an intake, relief and Venturi valve unit within said handle comprising a valve body communicating with the interior of said grease reservoir, an intake valve threaded in one end of said valve body and engaging said handle to retain said valve body therein and a relief valve in the other end of said valve body.

18. In a grease gun construction, a grease reservoir, a follower piston therein, a discharge head on one end of said grease reservoir and a cover head on the other end thereof, a handle on said cover head and an intake, relief and Venturi valve unit within said handle comprising a valve body communicating with the interior of said grease reservoir, an intake valve in one end of said valve body, a relief valve in the other end of said valve body and means to positively open said relief valve for operating said unit as a venturi.

19. In a grease gun construction, a grease reservoir, a follower piston therein, a discharge head on one end of said grease reservoir and a cover head on the other end thereof, a handle on said cover head and a valve unit within said handle, said valve unit comprising a valve body communicating with the interior of said grease reservoir, an intake valve in one end of said valve body, a Venturi constriction intermediate the ends of said valve body and a relief valve in the other end of said valve body.

20. In a grease gun construction, a grease reservoir, a follower piston therein, a discharge head on one end of said grease reservoir and a cover head on the other end thereof, a handle on said cover head and a valve unit within said handle, said valve unit comprising a valve body communicating with the interior of said grease reservoir, an intake valve in one end of said valve body, a Venturi constriction intermediate the ends of said valve body, a relief valve in the other end of said valve body, said relief valve comprising a spring seated valve member and a thumb screw in the end of said valve body opposite said intake valve, said thumb screw engaging the spring which seats said spring seated valve member to positively unseat said spring seated valve during Venturi operation.

IVAN L. EASTMAN.